United States Patent
Kellogg et al.

(10) Patent No.: US 7,424,455 B2
(45) Date of Patent: Sep. 9, 2008

(54) METHOD AND SYSTEMS FOR PROVIDING MERCHANT SERVICES WITH RIGHT-TIME CREATION AND UPDATING OF MERCHANT ACCOUNTS

(75) Inventors: Linda L. Kellogg, Omaha, NE (US); Steven W. Mathison, Omaha, NE (US); Tony W. Spurlock, Omaha, NE (US); David G. Weis, Omaha, NE (US); Alan R. Sharpee, Omaha, NE (US)

(73) Assignee: First Data Corporation, Greenwood Village, CO (US)

( * ) Notice: Subject to any disclaimer, the term of this patent is extended or adjusted under 35 U.S.C. 154(b) by 1266 days.

(21) Appl. No.: 10/245,789

(22) Filed: Sep. 17, 2002

(65) Prior Publication Data

US 2004/0054625 A1    Mar. 18, 2004

(51) Int. Cl.
    *G06Q 40/00* (2006.01)
(52) U.S. Cl. .............. 705/39; 40/44; 40/64; 235/375; 235/380; 370/352
(58) Field of Classification Search ............ 705/39–40, 705/44, 64; 235/375, 380; 370/352
See application file for complete search history.

(56) References Cited

U.S. PATENT DOCUMENTS

| | | | |
|---|---|---|---|
| 4,528,643 A | 7/1985 | Freeny, Jr. | |
| 4,700,055 A | 10/1987 | Kashkashian, Jr. | |
| 4,727,243 A | 2/1988 | Savar | |
| 4,884,212 A | 11/1989 | Stutsman | |
| 5,146,067 A | 9/1992 | Sloan et al. | |
| 5,220,501 A | 6/1993 | Lawlor et al. | |
| 5,255,182 A | 10/1993 | Adams | |
| 5,334,823 A * | 8/1994 | Noblett et al. ............. 235/380 | |
| 5,352,876 A | 10/1994 | Watanabe et al. | |
| 5,440,108 A | 8/1995 | Tran et al. | |
| 5,471,669 A | 11/1995 | Lidman | |
| 5,477,038 A | 12/1995 | Levine et al. | |
| 5,504,808 A | 4/1996 | Hamrick, Jr. | |
| 5,511,114 A | 4/1996 | Stimson et al. | |
| 5,513,117 A | 4/1996 | Small | |
| 5,557,516 A | 9/1996 | Hogan | |
| 5,592,400 A | 1/1997 | Sasou et al. | |
| 5,637,845 A | 6/1997 | Kolls | |
| 5,675,662 A * | 10/1997 | Deaton et al. ............... 382/137 | |

(Continued)

OTHER PUBLICATIONS

Business Wire ("OneCore.com Announces Breakthrough Online, Integrated Financial Services for Small and Mid-Sized Businesses Business/Technology"; Editors. Business Wire. New York: Aug. 10, 1999. p. 1).*

*Primary Examiner*—Harish T Dass
(74) *Attorney, Agent, or Firm*—Townsend and Townsend and Crew LLP

(57) ABSTRACT

Systems and methods for providing merchant services with right-time creation and updating of merchant accounts. Merchant-specific information for each merchant is stored in a record and used to process purchase card transactions submitted by the merchant. When a user creates or updates a merchant account record, the user can indicate whether the update is to take effect immediately or at a user-specified later time. An immediate update is processed substantially without delay. Other updates are queued for later processing and processed at the user-specified later time.

17 Claims, 10 Drawing Sheets

U.S. PATENT DOCUMENTS

| | | |
|---|---|---|
| 5,678,010 A | 10/1997 | Pittenger et al. |
| 5,721,768 A | 2/1998 | Stimson et al. |
| 5,777,306 A | 7/1998 | Masuda |
| 5,796,832 A | 8/1998 | Kawan |
| 5,868,236 A | 2/1999 | Rademacher |
| 5,903,633 A | 5/1999 | Lorsch |
| 5,936,221 A | 8/1999 | Corder et al. |
| 5,984,181 A | 11/1999 | Kreft |
| 5,987,438 A | 11/1999 | Nakano et al. |
| 5,991,748 A | 11/1999 | Taskett |
| 6,006,988 A | 12/1999 | Behrmann et al. |
| 6,129,275 A | 10/2000 | Urquhart et al. |
| 6,169,975 B1 | 1/2001 | White et al. |
| 6,193,155 B1 | 2/2001 | Walker et al. |
| 6,260,050 B1 * | 7/2001 | Yost et al. ................. 715/501.1 |
| 6,295,522 B1 | 9/2001 | Boesch |
| 6,298,336 B1 | 10/2001 | Davis et al. |
| 6,324,525 B1 | 11/2001 | Kramer et al. |
| 6,473,500 B1 | 10/2002 | Risafi et al. |
| 6,510,983 B2 | 1/2003 | Horowitz et al. |
| 6,752,313 B1 * | 6/2004 | Caviles et al. ................ 235/375 |
| 2001/0018660 A1 | 8/2001 | Sehr |
| 2001/0023409 A1 | 9/2001 | Keil |
| 2001/0023415 A1 | 9/2001 | Keil |
| 2002/0059142 A1 * | 5/2002 | Krause et al. ................. 705/44 |
| 2002/0062279 A1 | 5/2002 | Behrenbrinker et al. |
| 2002/0174016 A1 | 11/2002 | Cuervo |
| 2003/0053609 A1 | 3/2003 | Risafi et al. |

\* cited by examiner

METHOD AND SYSTEMS FOR PROVIDING MERCHANT SERVICES WITH RIGHT-TIME CREATION AND UPDATING OF MERCHANT ACCOUNTS

CROSS-REFERENCES TO RELATED APPLICATIONS

This application includes subject matter related to co-pending U.S. patent application Ser. No. 10/245,784, filed on the same date as the present application, entitled "Method and System for Merchant Processing of Purchase Card Transactions with Expanded Card Type Acceptance," which disclosure is incorporated herein by reference in its entirety for all purposes.

This application includes subject matter related to co-pending U.S. patent application Ser. No. 10/119,205, filed Apr. 8, 2002, entitled "System and Method for Managing Account Addresses," which disclosure is incorporated herein by reference in its entirety for all purposes.

BACKGROUND OF THE INVENTION

The invention relates generally to processing of purchase card transactions and in particular to methods and systems for providing merchant services related to purchase card transaction processing.

A merchant who accepts purchase cards as payment for goods or services generally has an agreement with an acquiring bank for processing of purchase card transactions. As part of the agreement, the merchant maintains an account at the acquiring bank for deposit and withdrawal of funds associated with the merchant's purchase card transactions.

Purchase cards are issued to cardholders by a variety of card issuers, including banks, retailers, or other financial service providers. In the case of "interchange" cards, e.g., VISA or MASTERCARD card products, there is a card association that acts as an intermediary between the acquiring bank and the card issuer to complete a credit card transaction. (Rather than issuing cards itself, a card association generally licenses other entities to issue cards under its brand name.) In the case of "private label" credit cards, e.g., credit cards issued by a retailer, there is generally no intermediary; hence, such cards are generally accepted only by the issuing entity (or in some cases its subsidiaries).

A typical purchase-card sales transaction begins when a cardholder presents a purchase to a merchant in payment for goods or services. The merchant transmits an authorization request to its acquiring bank. In the case of interchange cards, the acquiring bank typically does not have direct access to information regarding cardholder account status, so the acquiring bank forwards the request to the appropriate card association for authorization.

If the transaction is authorized, an authorization code is returned to the merchant. The merchant completes the sales transaction with the cardholder by delivering the goods or services and obtaining in exchange a ticket representing the cardholder's agreement to pay the card issuer. The ticket is typically a piece of paper (usually signed by the cardholder) or an electronic equivalent. The ticket provides sufficient information to identify the cardholder, the card used, the merchant, and the amount of the transaction.

Next, the merchant collects payment for the transaction by presenting the ticket to the acquiring bank. Typically, the merchant accumulates tickets from a number of transactions (e.g., all transactions from one day) and presents a batch of tickets together to the acquiring bank. The acquiring bank acquires the ticket and deposits funds into the merchant's account. In general, the amount of funds deposited into the merchant's account is less than the amount of the sales transaction by a percentage (the "discount rate") established between the merchant and the acquiring bank. The acquiring bank may also maintain a reserve against the merchant account by temporarily withholding part of the funds in order to cover the risk that the acquiring bank is not subsequently repaid by a card issuer for any of the merchant's transactions. Funds held in reserve are usually released to the merchant account after some period of time.

The acquiring bank presents the ticket to the card issuer for settlement. Settlement requests may be processed in batches and may be routed through a card association rather than being sent directly to the card issuer. The card issuer transfers funds to the acquiring bank in exchange for the ticket. The amount of funds transferred is, in general, less than the amount of the sales transaction because the card issuer deducts an "interchange fee" reflecting the delay between the card issuer's payment to the acquiring bank and the cardholder's payment to the card issuer, as well as any costs associated with use of a card association's interchange services. At some point after settlement, the card issuer bills the cardholder for the full amount of the transaction, and the cardholder pays the card issuer according to the terms of their agreement.

For a transaction where a private label credit card is used, the processing is similar, except that the acquiring bank and the card issuer are generally the same entity. Thus, the acquiring bank is able to authorize the transaction, and settlement between the card issuer and the acquiring bank is not required. As is generally known, acquisition and settlement processing may have many other variations, depending on the card product used and the card acceptance policies adopted by various card issuers and associations (e.g., some card associations settle directly with the merchant and do not transfer funds to the acquirer).

Acquiring banks are thus confronted with considerable complexity in managing purchase card operations, particularly when the bank provides card processing services for a large number of merchants who accept a variety of card products of different card associations and/or issuers. Transactions must be received and routed, and accounting of debits and credits of funds during acquisition and settlement must be maintained. Information for each merchant must be kept up-to-date. Periodic account statements and other activity reports must be generated and sent to each merchant. Further, an acquiring bank may outsource some or all of its merchant processing operations to a third-party provider of merchant processing services. These third-party providers confront an added level of complexity because of the need to manage data and transactions for multiple acquiring banks.

Existing systems generally rely on batch processing to perform all merchant processing functions, including monetary transactions (e.g., acquisition and settlement) and non-monetary transactions (e.g., opening and closing merchant accounts, changing merchant account terms, and updating merchant contact information). In batch processing, transaction requests are received by the acquiring bank or third-party merchant services provider and accumulated for periodic processing, e.g., once per day. Until the batch is processed, the transaction remains incomplete, and information related to the transaction is generally unavailable to merchants or acquiring banks. Moreover, any errors in the batch cannot be corrected until the next batch update cycle. Thus, batch processing limits the ability of acquiring banks or third-party providers to provide merchant processing services in real time; a merchant may have to wait a day or more for a desired change, such as the ability to accept a new type of credit card, to take effect.

Hence, it would be desirable to provide reliable and efficient merchant processing systems that can be used to manage merchant services more effectively.

BRIEF SUMMARY OF THE INVENTION

Embodiments of the present invention provide systems and methods for providing merchant services with "right-time" creation and updating of merchant accounts. Merchant-specific information for each merchant is stored in a record and used to process purchase card transactions submitted by the merchant. When a user creates or updates a merchant account record, the user can indicate whether the update is to take effect immediately or at a user-specified later time. An immediate update is processed substantially without delay. Other updates are queued for later processing. In some embodiments, an update affecting a number of merchants can be processed in response to a single user request, and in other embodiments, updates to a number of different information-containing fields for a merchant can be performed with a single user request. Such systems and methods can enable an acquirer or a third-party provider of merchant services to respond more effectively to requests from merchants and to manage its data entry tasks in a more efficient manner.

According to one aspect of the invention, a method for providing purchase card transaction processing services to a plurality of merchants is provided. A merchant account record is associated with each merchant. The merchant account record includes a plurality of fields for storing merchant-specific information. The merchant account record for one of the merchants is updated by processing a non-monetary transaction. Processing the non-monetary transaction includes identifying the merchant account record to be updated and receiving input data from a user. The input data includes information identifying which of the plurality of fields is to be updated and new data to be stored in the identified field. The user also provides an effective date on which the identified field is to be updated. The effective date can correspond to either immediate updating or updating at a subsequent scheduled time selected by the user. Upon receiving an effective date corresponding to immediate updating, the identified field is updated to store the new data, substantially without delay. Upon receiving an effective date corresponding to updating at a subsequent scheduled time, the input data are queued in association with the effective date in an eventing queue. The eventing queue is automatically and periodically checking the eventing queue to determine whether the effective date has arrived; when the effective date has arrived, the identified field is updated to store the new data. Subsequently, the merchant-specific information from the updated merchant account record is used to process a monetary purchase card transaction submitted by the merchant. Prior to queuing the input data in the eventing queue or updating the merchant record, one or more edit checks can be performed to detect a conflict between the input data and reference data, such as data in another field of the merchant record or data relating to industry rules. When a conflict is detected, a user can be notified. Prior to queuing the input data in the eventing queue, the eventing queue can be checked to detect a previously entered pending update to the same merchant account record. When a previously entered pending update is detected, a user is notified.

In some embodiments, a non-monetary transaction can be processed to update more than one of the plurality of merchant account records in response to a single user request. A group of merchant account records to be updated is identified from the single user request. Input data is received, including information identifying a field in each of the group of merchant account records to be updated and new data to be stored in the identified field. The identified field in each of the group of merchant account records is updated, either without substantial delay or at a subsequent scheduled time, with the input data specifying when the identified field is to be updated. When the update is to occur at a subsequent scheduled time, the eventing queue may be used to cause the update to occur at the desired time.

In some embodiments, a non-monetary transaction can also be processed to update a plurality of fields in one of the merchant account records in response to a single user request.

According to another aspect of the present invention, a method for providing purchase card transaction processing services to a plurality of merchants is provided. A new merchant account record is created for a new one of the plurality of merchants. The new merchant account record includes a plurality of fields for storing merchant-specific information. One or more of the fields are populated with default values. Input data for at least one of the fields is received. In response to a user request, the new merchant account record is activated, thereby enabling the new merchant to submit purchase card transactions for processing. Activating the new merchant account record is performed either substantially without delay upon receiving the user request or at a subsequent scheduled time. The merchant-specific information from the new merchant account record is then used to process a monetary purchase card transaction submitted by the new merchant. The user request can specify whether the activation of the new merchant account record is to be performed substantially without delay or at a subsequent time selected by the user. When input data for one of the fields is received, an edit check can be performed to detect a conflict between the input data and reference data, such as data in another field of the merchant record or data reflecting industry rules. When a conflict is detected, a user can be notified.

In some embodiments, merchant information files are generated from the merchant account records, and during processing of a monetary purchase card transaction, merchant-specific information is obtained by accessing an updated merchant information file. In these embodiments, generation of a merchant information file for a particular merchant can happen either without substantial delay upon a user request or at a scheduled time.

In some embodiments, during transaction processing, a ticket record is created in a ticket data store using the transaction data for the monetary purchase card transaction. The ticket record includes ticket status information that is updated to reflect a current status of processing of the purchase card transaction.

In some embodiments, the merchant-specific information for a merchant includes a plurality of account identifiers, each account identifier associated with at least one of a plurality of usage codes. During processing of a monetary purchase card transaction for which funds are to be transferred to the merchant, one of the plurality of usage codes is selected, and the account identifier associated with the selected usage code is used to identify the merchant account to which funds are to be transferred.

In some embodiments where the acquirer reimburses the merchant for a monetary purchase card transaction, the merchant-specific information is also used to determine whether the merchant participates in a reserve. If the merchant participates in a reserve, a reserve adjustment amount is deducted from the reimbursement amount and transferred to a reserve; the remainder is transferred to the merchant account.

According to another aspect of the invention, a system for providing purchase card transaction processing services to a plurality of merchants is provided. The system includes a data store having a merchant account record associated with each of the plurality of merchants, each merchant account record including a plurality of fields for storing merchant-specific information. To process a non-monetary transaction to update a merchant account record associated with a merchant, the system includes control logic configured to identify the merchant account record to be updated and to receive input data including information identifying which of the plurality of fields is to be updated, new data to be stored in the identified field, and an effective date on which the identified field is to be updated, where the effective date corresponds to either immediate updating or updating at a subsequent scheduled time. Additional control logic is configured to update the identified field to store the new data substantially without delay upon receiving an effective date corresponding to immediate updating or to queue the input data in an eventing queue upon receiving an effective date corresponding to updating at a subsequent scheduled time. Additional control logic is configured to automatically and periodically check the eventing queue to determine whether the effective date has arrived and to update the identified field to store the new data when the effective date has arrived. The system also includes control logic configured to process a monetary purchase card transaction submitted by the merchant using the merchant-specific information from the updated merchant account record.

According to another aspect of the invention, a system for providing purchase card transaction processing services to a plurality of merchants is provided. The system includes control logic configured to create a new merchant account record for a new one of the plurality of merchants, the new merchant account record including a plurality of fields for storing merchant-specific information. The system also includes control logic configured to populate at least one of the fields with respective default values and control logic configured to receive input data for at least one of the fields. The system also includes control logic configured to activate the new merchant account record in response to a user request, thereby enabling the new merchant to submit purchase card transactions for processing. Activating the new merchant account record is performed either substantially without delay upon receiving the user request or at a subsequent scheduled time. The system also includes control logic configured to use the merchant-specific information from the new merchant account record to process a monetary purchase card transaction submitted by the new merchant.

The following detailed description together with the accompanying drawings will provide a better understanding of the nature and advantages of the present invention.

DETAILED DESCRIPTION OF THE INVENTION

The present invention provides improved merchant processing systems and methods that may be used by acquiring banks or third-party providers of merchant processing services to process purchase card transactions. In some embodiments, the system may provide improved efficiency and better service by reducing delays associated with updates to merchant information.

Figure 1:
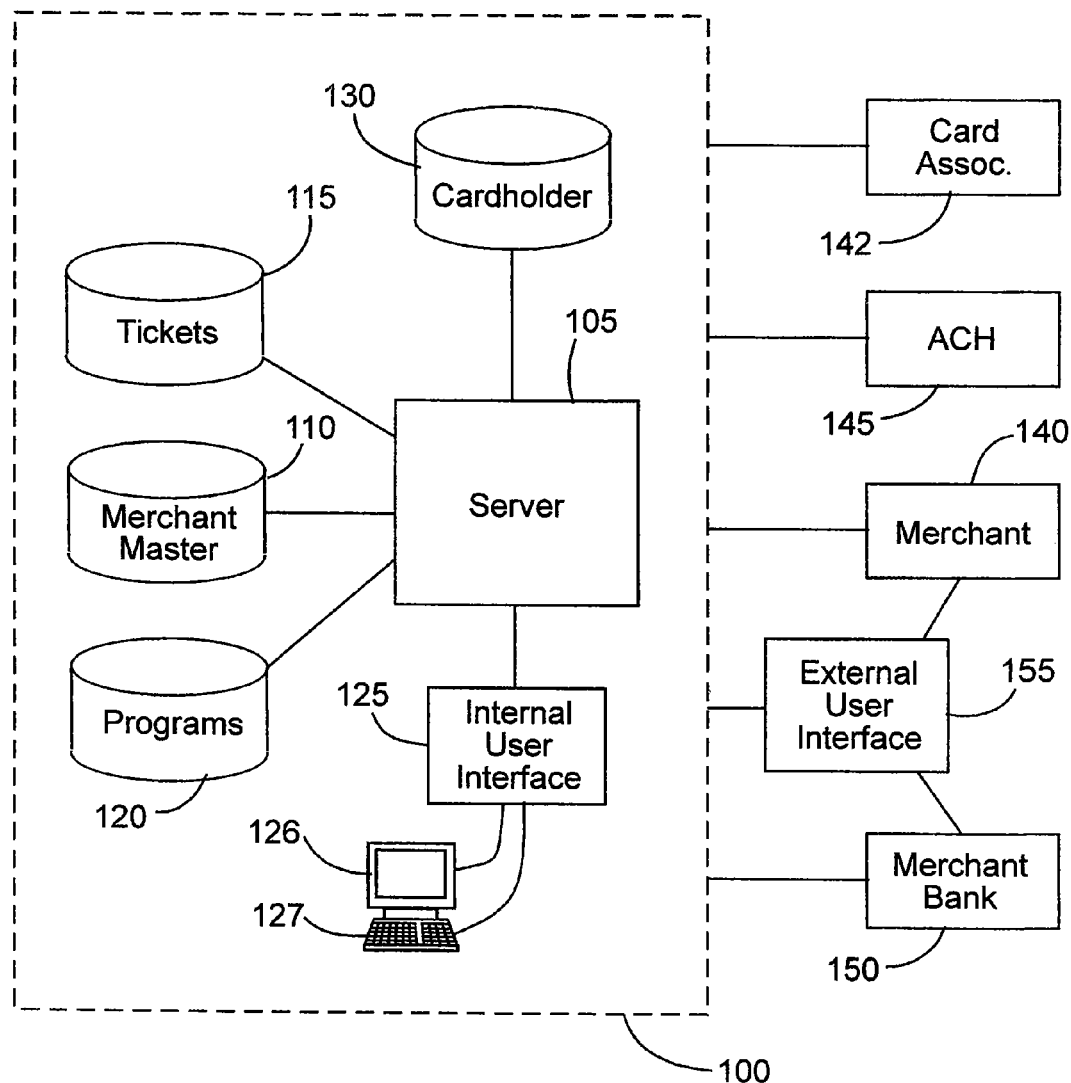
FIG. 1 is a simplified block diagram of a merchant processing system according to an exemplary embodiment of the present invention.

FIG. 1 is a simplified block diagram of a merchant processing platform 100 according to an embodiment of the present invention. Merchant processing platform 100 operates to provide merchant processing services for one or more acquiring banks. In one embodiment, merchant processing platform 100 is under the control of an acquiring bank; in another embodiment, merchant processing platform 100 is under the control of a third-party provider and is used to provide merchant processing services for one or more acquiring bank clients of the third-party provider.

Merchant processing platform 100 includes a server 105, which may be a single computer or a plurality of networked computers. In general, server 105 manages updating of merchant information, processing of individual transactions, and reporting of merchant account activity as will be further described below. Various operations of server 105 may be automated; for instance, settlement of a batch of tickets may be automatically initiated on a daily basis. It will be appreciated by persons of skill in the art that where server 105 is implemented as a plurality of computers, the various functions of server 105 may be assigned to various ones of the computers in any suitable manner.

Server 105 accesses various databases including a merchant master database 110 and a ticket database 115. Merchant master database 110 provides centralized storage of merchant-specific information needed to process transactions for a particular merchant. The content, organization, and updating of merchant master database 110 will be further described below. Ticket database 115 contains information regarding individual credit card transaction tickets, as described further below. In the embodiment shown, server 105 also accesses a program library 120 that houses computer-executable instructions for performing various merchant processing functions. Server 105 may be configured to execute various programs from library 120 automatically (e.g., on a periodic basis) or in response to user commands received via an internal user interface 125.

Internal user interface 125 enables authorized personnel (generally, persons affiliated with the acquiring bank or third-party provider) to interact with server 105 to perform functions including executing programs from library 120, updating merchant master database 110 and ticket database 115, and updating program library 120. Internal user interface 120 may include hardware or software security components (e.g., password authentication) to prevent unauthorized use. Internal user interface 125 includes a display device for presenting information to a user, e.g., a computer monitor 126, and a user input device for accepting input from a user, e.g., a keyboard 127. A user may access internal user interface 125 directly or via any suitable network connection, e.g., via leased lines, telephone lines, virtual private networks, or the Internet.

In some embodiments, platform 100 is configured to process private label credit card transactions, in which case platform 100 may also include a cardholder database 130.

Platform 100 communicates with various external components to perform merchant processing functions. In the embodiment shown, platform 100 communicates with one or more merchants 140; one or more card associations 142, e.g., VISA or MASTERCARD; and an electronic transaction clearinghouse 145, e.g., the Federal Reserve Automated Clearinghouse (ACH) system. In some embodiments, platform 100 may also communicate with one or more acquiring banks 150.

An external user interface 155 may also be provided to allow direct access to information contained in server 100 by merchants 140 and/or acquiring banks 150. Like internal user interface 125, external user interface 155 may be implemented with hardware or software security components (e.g., password authentication) to prevent unauthorized use. In general, external user interface 155 is more limited than internal user interface 125 with regard to allowed operations. For instance, external user interface 155 is preferably limited to viewing data from merchant master database 110 and ticket database 115. When external user interface 155 is provided, merchants 140 and/or acquiring banks 150 may obtain information about the status of transactions directly, i.e., without going through an intermediary who has access to internal user interface 125.

Communication between platform 100 and the various external components may take place over a variety of networks, including leased lines, telephone lines, virtual private networks, or the Internet. Hardware and/or software-based security components (not shown) such as firewalls and data encryption systems may also be provided.

It will be appreciated that the description of platform 100 is illustrative and that platform 100 and its associated functionality can also be implemented using more or fewer components than those described herein. Based on the disclosure and teachings provided herein, a person of ordinary skill in the art will recognize other ways and/or methods for implementing the present invention.

Further aspects of platform 100 including exemplary processing methods are described below. Section I describes an exemplary embodiment of a merchant record in merchant master database 110. Section II describes a hierarchical structure that may be advantageously used to organize merchant records stored in merchant master database 110. Section III describes exemplary methods for updating merchant records stored in merchant master database 110, including adding a new merchant record. Section IV describes processing of merchant credit card transactions using platform 100, including ticket database 115. Section V describes reporting and data access features of platform 100, including flexible routing of correspondence to various addresses, viewing of ticket information in real time; and a secure World Wide Web interface embodiment of external user interface 155. While platform 100 is referred to as an example throughout the disclosure, it will be appreciated that the methods described below may be implemented using other systems, and that variations and modifications of platform 100 are possible. Further, while the examples below generally describe platform 100 as being under the control of a third-party provider, it is to be understood that similar methods could be practiced with platform 100 under the control of an acquiring bank or other acquirer.

I. Merchant Master Database Record

Merchant master database 110 includes a record related to each merchant for whom processing services are provided by platform 100. Merchant master database 110 is used by various merchant processing applications, examples of which will be described below. In an exemplary embodiment, merchant master database 110 is maintained by an acquirer or by a third-party provider. Optionally, a merchant may be authorized to update certain fields of its own record directly.

Figure 2:
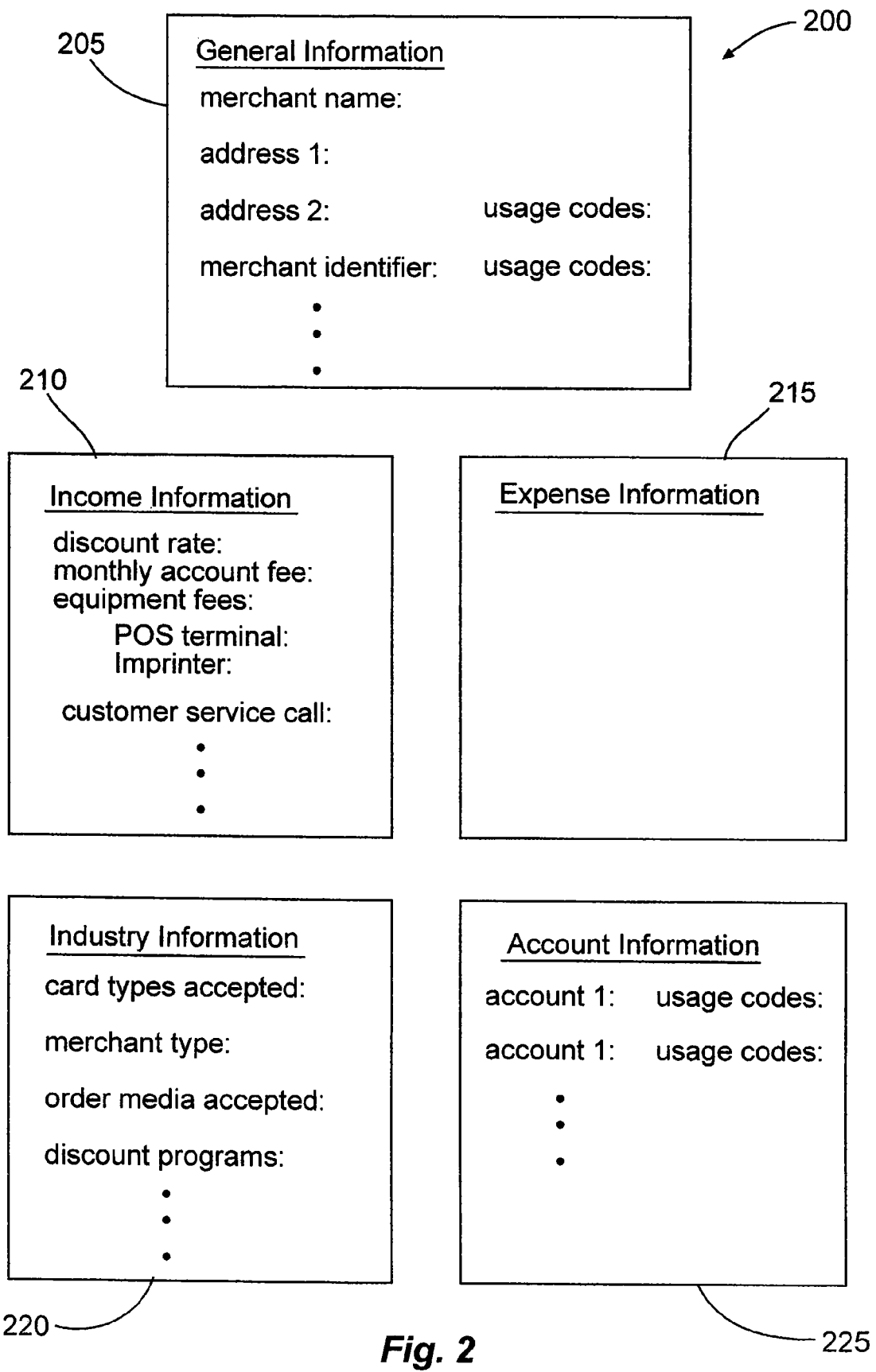
FIG. 2 is a simplified block diagram of a merchant master database record according to an embodiment of the present invention.

An embodiment of a merchant record 200 in merchant master database 110 is shown in FIG. 2. The information in merchant record 200 is organized into a number of sections, each containing one or more fields. General information section 205 includes the merchant's name and contact information, including address(es) and telephone number(s) for the merchant. General information section 205 also includes a merchant identifier, which may be a number or alphanumeric code that uniquely identifies the merchant record 200.

Preferably, general information section 205 can include multiple addresses associated with a particular merchant. Each address has associated with it one or more usage codes, as shown in section 205. The usage code(s) associated with an address indicate the type(s) of correspondence that is (are) to be sent to that address. For instance, in one embodiment, a usage code of "7" may correspond to the monthly statement of the merchant account, a usage code of "2" may correspond to notices of changes in account terms, and so on. For a particular merchant, usage code "7" may be associated with address "1" (the merchant's corporate headquarters) and with address "2" (its outside accountant), while usage code "2" may be associated only with address "1." For this example, monthly account statements are sent to both of addresses "1" and "2" while notices of changes in terms are sent only to address "1." Other usage codes and other combinations of usage codes and addresses are also possible. Further description of an address management technique suitable for use with merchant master database 110 is provided in the above-referenced U.S. patent application Ser. No. 10/119,205, "System and Method for Managing Account Addresses," filed Apr. 8, 2002.

Merchant record 200 also contains income information section 210. This information relates to charges that the acquirer may impose against the merchant account. For instance, the discount rate (a percentage deducted from the value of each ticket before forwarding funds to the merchant) associated with the merchant may be included as a field in section 210. Additionally, the acquirer may impose other fees; for instance, in the embodiment shown, income information section 210 includes fields for a monthly account maintenance fee, purchase prices for various items of credit card processing equipment such as point-of-sale terminals or charge slip imprinters, fees for customer service activity (which may be billed to the merchant, e.g., on a per-call basis). It will be appreciated that these fields are merely illustrative and that the fees charged to a merchant may be varied.

Income information section 210 may be used to compute amounts to be deducted from the merchant account. For instance, during processing of a sales transaction (described in more detail below), the discount rate may be retrieved from merchant record 200. Likewise, customer service charges, monthly charges, equipment charges, and the like may be computed and debited to the merchant account by a regularly occurring process that determines the appropriate fees by accessing merchant record 200.

Merchant record 200 also includes expense information section 215, which reflects the costs to the acquirer of providing the merchant account. Fields in expense information section 215 generally correspond to the fields in income information section 210, but the data entered in each field may be different. The amounts entered in each field of expense information section 215 generally reflect any charges that the acquiring bank pays to vendors or service providers, plus appropriate overhead. An acquirer may use information from income section 210 and expense information section 215 together for assessing merchant profitability.

Merchant record 200 also includes industry information section 220. In the embodiment shown, industry information section 220 includes fields for identifying the card products that are accepted by the merchant (e.g., VISA products, MASTERCARD products, private label card products). Accepted card products may be identified by alphanumeric codes or other suitable means. Examples of suitable techniques for defining and using card acceptance information is described in detail in the above-referenced U.S. patent application Ser. No. 10/245,784. Other techniques can also be used. Industry information section 220 also includes information about the type of goods or services sold by the merchant (e.g., clothing retailer, grocery store), which may be represented using a coding scheme such as the well-known Standard Industrial Classification ("SIC") codes or North American Industry Classification System ("NAICS") codes, as well as the media by which the merchant is authorized to conduct sales (e.g., in-store, mail-order, telephone-order, and/or Internet). If the merchant is a chain outlet, that information may also be included in a field in section 220, for instance via a chain identifier.

Industry information section 220 may also include information related to the merchant's participation in a reserve. More specifically, if the acquirer has chosen to maintain a reserve against the merchant account to protect the acquirer against nonpayment by card issuers, the terms of the reserve may be specified. In some embodiments, the reserve field stores a reference to a computer program used to manage the reserve, as will be described further below. Additionally, industry information section 220 may include fields for information related to the merchant's participation in various discount or rewards/incentive programs that may be offered by the acquirer, card associations, or other vendors.

Industry information section 220 may be used during transaction processing, for instance, to verify that the merchant is authorized to accept the card product presented by the cardholder. In addition, an acquirer may use data contained within industry information section 220 in pricing the merchant account. For instance, a first merchant who accepts credit cards for mail order or Internet transactions may expose the acquirer to a higher risk of nonpayment than a second merchant who conducts only in-store sales; the acquirer may price the first merchant account correspondingly higher. Industry information section 220 may also be used in various reporting applications. For example, if a merchant is a chain outlet, the merchant's purchase-card activity may be rolled up with purchase-card activity of other merchants in the chain and reported to corporate headquarters at the chain level. As another example, an acquirer may use data contained in industry information section 220 to analyze the performance (e.g., profitability) of its merchant account portfolio by type of business, by comparing merchants who accept mail-order sales against merchants who do not, and the like.

Merchant record 200 further includes deposit account information section 225. This section generally includes information needed to credit funds to or debit funds from one or more deposit accounts maintained by the merchant at one or more banks. For instance, when merchant master database 110 is implemented in a processing system that uses the Federal Reserve Automated Clearinghouse (ACH) system to perform electronic funds transfers, the information for each deposit account includes a transit routing number identifying a host financial institution for the account and a demand deposit account number within that institution. In the embodiment shown in FIG. 2, a merchant record 200 may include more than one deposit account number, thereby allowing the acquirer to direct a particular electronic funds transfer transaction to one of several accounts held by the merchant. For instance, it may be desirable to have funds deposited in a first deposit account and debits deducted from a second deposit account. As will be described in more detail below, usage codes associated with each deposit account identifier may be used to control which transfer transactions use each deposit account. In one embodiment, five usage codes are supported, corresponding to deposits, adjustments, discounts, debits, and monthly fees. Multiple usage codes may be associated with the same deposit account so that a merchant is not required to maintain multiple deposit accounts. It will be appreciated that any number of usage codes could be supported.

It will be appreciated that merchant record 200 is illustrative, and that the content and arrangement of merchant-specific data can be varied. Moreover, merchant master database 110 may be implemented using any suitable database technology, for instance IBM's DB2 database product or other commercially available database products.

II. Merchant Hierarchy

Figure 3:
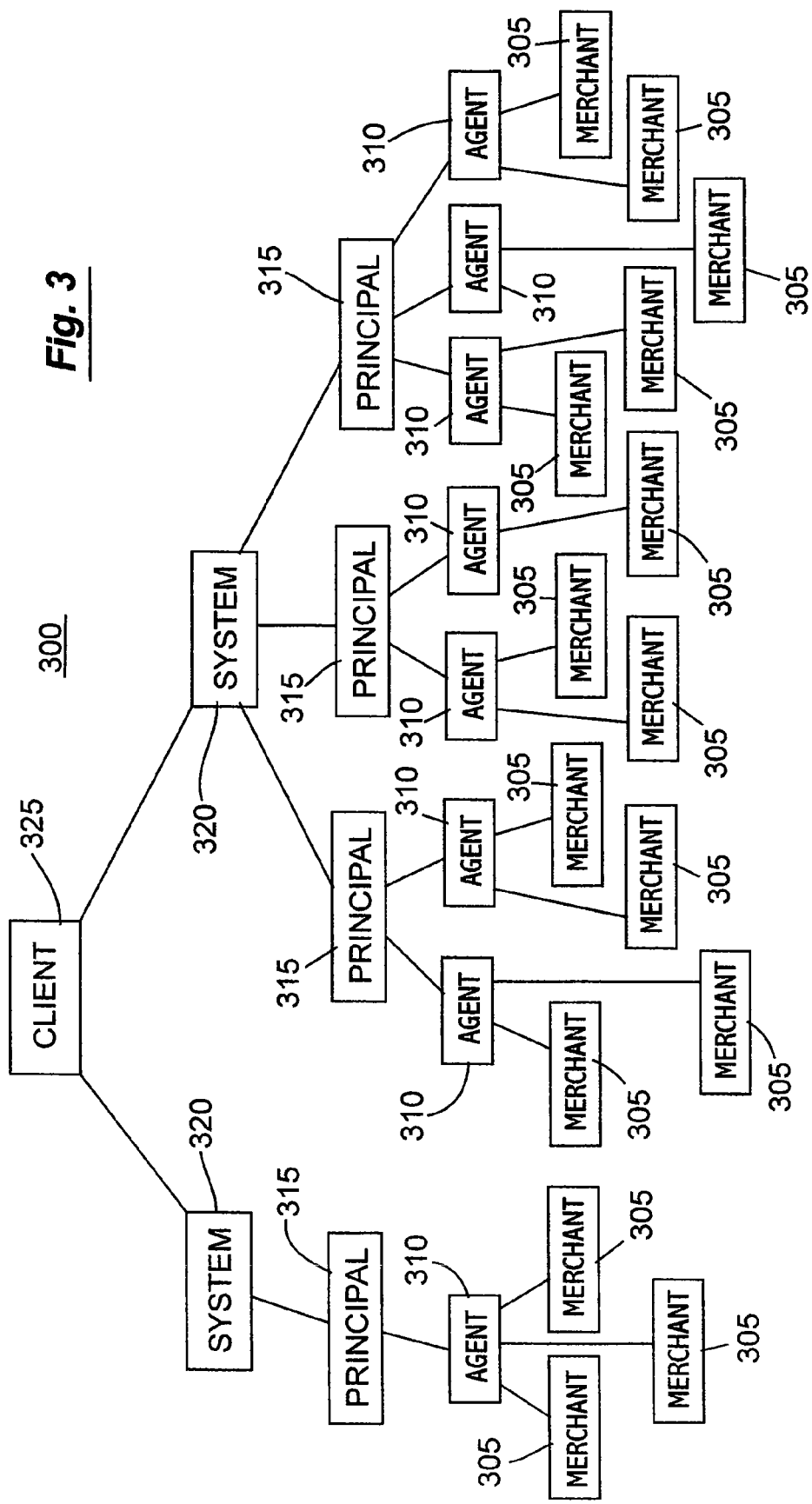
FIG. 3 is a simplified block diagram of a merchant hierarchy according to an embodiment of the present invention.

Merchant records within merchant master database 110 may be organized hierarchically for reporting or other purposes. An example of a hierarchical organization 300 is shown in FIG. 3. Each merchant 305 corresponds to a merchant record in the merchant master database 110. Each merchant 305 is associated with an agent 310, each agent 310 with a principal 315, each principal 315 with a system 320, and each system 320 with a client 325. The location of a particular merchant 305 may be indicated in the merchant master record 200 (FIG. 2) for the merchant. For instance, the merchant identifier may be a numerical identifier having an internal structure such that the first group of digits indicates a client 325, the second group indicates a system 320, and so on.

In general, an agent 310 may represent any grouping of merchants 305 that an acquirer or third party provider finds useful. Principals 315, systems 320, and clients 325 may each represent successively larger groupings of merchants 305. Reporting of account status and activity is provided at each of the merchant, agent, principal, system, and client levels. Thus, hierarchy 300 may be used by an acquirer or third-party service provider to manage a large portfolio of merchant accounts without implementing multiple merchant databases.

For example, in some embodiments, a third party service provider manages merchant account portfolios for a number of acquirers and identifies each acquirer as a different client 325. The intermediate levels of the hierarchy (system, principal, and agent) may be customized for each acquirer to provide a reporting structure that the acquirer finds desirable. In one embodiment, one acquirer may define agents and/or principals to represent various groupings of merchants. Other acquirers may use the various levels to sort merchants based on associations with small affiliate banks, sales territories, geographic regions or specific sales people. Acquirers may also use the hierarchical structure to sort merchants according to deposit or ticket submission methods used by the merchant (e.g., tape entered monetary batches, electronic entered batches and paper batches).

In some embodiments, not all levels of the hierarchy need be defined or used. For instance, an acquirer (client) may have merchants reporting directly under a principal or system. Where a structured merchant identification number provides the hierarchical information, this can be implemented by using a designated value (e.g., all zeroes) for a block of digits to indicate an undefined level. Thus, in a particular implementation, there will generally be at least one client and at least one merchant; there may be any number (including zero) of systems, principals, and agents.

In some embodiments, hierarchy information about a merchant may be used to control various aspects of transaction processing for that merchant. For instance, the system 320 within which a particular merchant 305 resides may be used to determine where the merchant's tickets should be routed for authorization and/or settlement. As another example, hierarchy information may be used to determine when a batch of transactions is submitted for settlement (e.g., batches from all merchants identified with a particular system are processed beginning at a designated time each day).

It will be appreciated that the hierarchy presented here is an example, and that merchant processing systems may be implemented with other hierarchies or with no hierarchy.

III. Updating the Merchant Master Database

In platform 100 of FIG. 1, "non-monetary" transactions can be performed to update records in merchant master database 110. As used herein, a non-monetary transaction refers generally to any update of a merchant record 200 in merchant master database 110 that does not result from a purchase card transaction. Examples of processing of non-monetary transactions will now be described. These transactions may be implemented using programs in program library 120 that may be invoked by an operator via internal user interface 125. The programs for processing non-monetary transactions may include a security protocol to ensure that the particular operator invoking the program is authorized to modify merchant master database 110.

Figure 4:
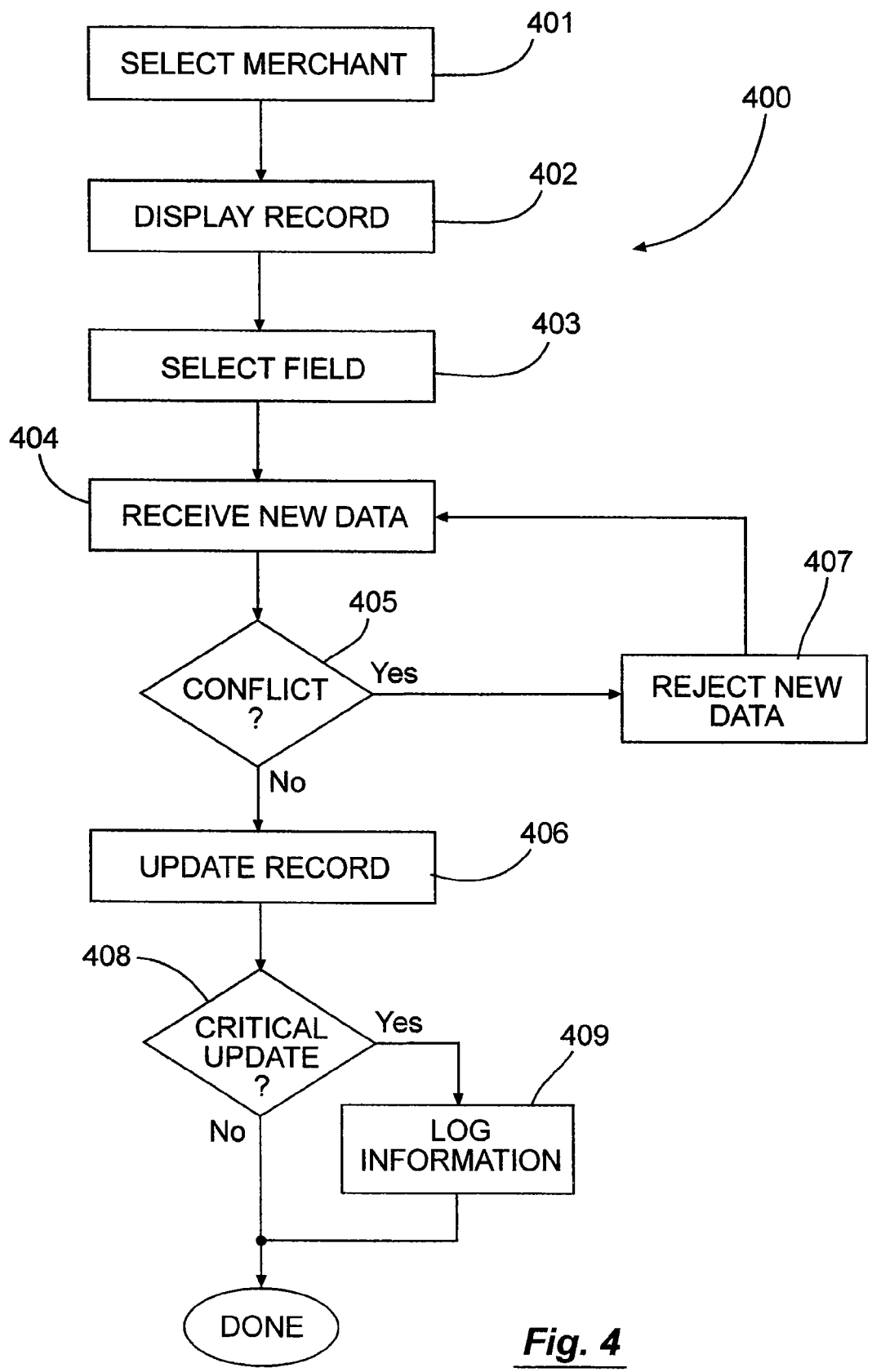
FIG. 4 is a flow chart of an exemplary process for processing a non-monetary transaction according to the present invention.

An exemplary process 400 for processing a non-monetary transaction is illustrated in 25 FIG. 4. Process 400 can be used to process any non-monetary transaction, for instance, changing a merchant's address or changing the discount rate applied to a merchant account. Process 400 involves selecting a merchant record 200 (FIG. 2) to be updated and entering new data for a selected field in the record. Before the database is updated, testing is performed to validate the new information. In addition, information regarding the updating process may be recorded in an audit log.

At step 401, the operator selects a merchant whose record is to be updated. For instance, the operator may enter a merchant identifier, navigate a merchant hierarchy displayed on the screen, or initiate a search of merchant master database 110 using the merchant name or other merchant information and select a merchant from the search result. At step 402, the merchant record 200 for the selected merchant is displayed. In some embodiments, merchant record 200 includes more information than can be conveniently displayed at a single time, in which case the record is divided into screens and user controls (e.g., keystrokes) for navigating among the screens are provided. Record data may be divided among multiple screens in any suitable manner. At step 403, the operator selects a field to be updated, for instance, the "discount rate" field. At step 404, the operator inputs new data for the selected field, for instance, a new discount rate of 4%.

At step 405, the transaction process performs one or more tests, referred to herein as "edit checks," to determine whether the new data creates a conflict. Conflicts may arise for various reasons, including entry of an incorrect type of data for the field, as well as conflicts with other entries, with processing rules established for the merchant account (e.g., based on the system to which the merchant account is assigned), with applicable industry rules, or with government regulations. Each edit check detects a particular conflict.

For example, industry rules may require merchants to participate in different interchange programs (having different terms and conditions) depending on whether they are Internet merchants or traditional "brick-and-mortar" merchants. An edit check can be performed whenever the "interchange program" field is updated. This edit check looks at the "type of merchant" field to make sure that it contains a type qualified for the selected interchange program. As another example, the selected ticket type for the merchant (e.g., tape entry, online entry, electronic entry) can be checked for consistency with entries in other fields so that transactions can be processed properly.

If a conflict is detected, then at step 407 the update is rejected and the operator is notified of the reason for rejection. In one embodiment, any conflict causes the process to return to step 404 to allow the operator to enter new data. In an alternative embodiment, the operator is prompted to select from "abort," "edit," or "proceed" options. If "abort" is selected, the transaction is aborted and no updates are made. If "edit" is selected, the process returns to step 404 to receive new data. If "proceed" is selected, the process continues to step 406, where the merchant record is updated. For some types of conflicts, the "proceed" option may be disabled, e.g., where the proposed update would be impossible or unlawful. Other prompts can also be implemented.

If no conflict is detected, then at step 406 the update is performed. Step 406 generally includes writing new data to the merchant record 200 stored in merchant master database 110. If all processing jobs running on platform 100 obtain merchant information directly from merchant master database 110, then the update will have essentially immediate effect. In some embodiments, however, processing jobs running on platform 100 do not access merchant records 200 directly; instead, the jobs access a data file (e.g., a Virtual Storage Access Method, or VSAM, file) for each merchant that is periodically (e.g., once per day) back-built from merchant records 200. In these embodiments, changes to the merchant record 200 have no effect on processing until the next back-build cycle.

To reduce or eliminate such delays, a "right-time" processing option may be provided to enable the operator to initiate a near-immediate rebuild of the VSAM file for the merchant whose record has been updated. The rebuild occurs as soon as possible rather than waiting for the next regular back-build cycle. The rebuild may be done by reading the newly-updated merchant record 200 from merchant master database 110, or it may be executed directly from the entered data, in parallel with the database update. It will be appreciated that "right-time" processing can also be implemented as a default processing mode, thereby not requiring a specific operator request to initiate it.

An audit log may also be implemented to provide tracking of selected non-monetary transactions. For instance, an acquirer or third-party merchant services provider may designate non-monetary transactions affecting certain fields of a merchant record as "critical," meaning that details regarding any updates to those fields are to be logged. When an audit log is implemented, at step 408, the process determines whether the updated field is one of the designated critical fields. If so, then at step 409 an audit log entry is created before the process ends. The audit log entry includes information such as the date, the identity of the operator who entered the update, the merchant identifier, the field that was updated, and old and new data values. Audit log entries are stored either in the merchant record or in a separate file or database. The entries are then used for reporting and/or review as described below.

The audit log may be viewed using a separate review program, which is also invoked by an operator via internal user interface 125. The audit log review program provides various ways to view records of critical changes. For instance, updates may be viewed by date, by merchant, by field affected, and so on.

Figure 5:
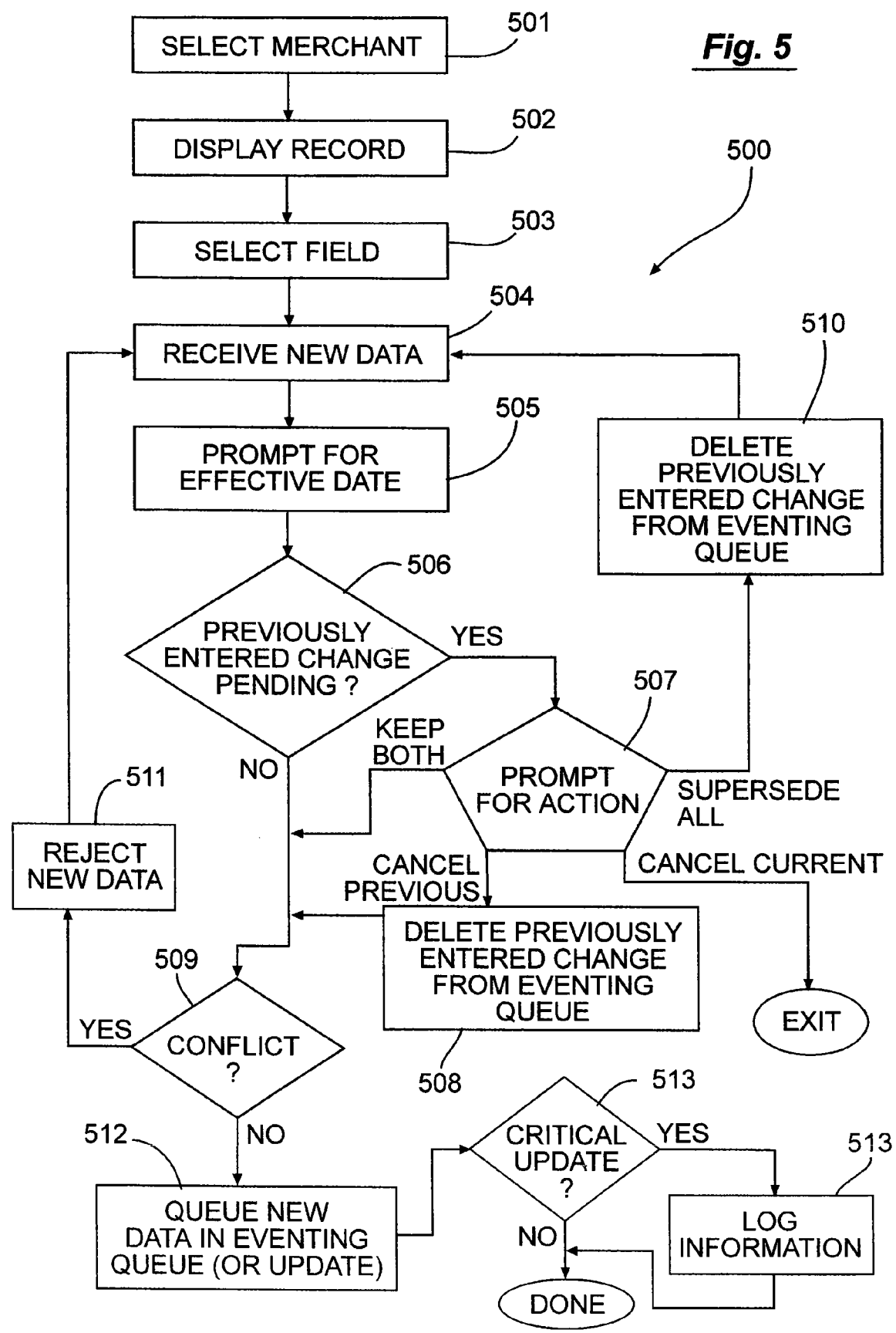
FIG. 5 is a flow chart of a second exemplary process for processing a non-monetary transaction according to the present invention.

A second exemplary process 500 for processing a non-monetary transaction is illustrated in FIG. 5. This process supports entering updates that are to take effect at a specified future date. Each "future" update is stored in an eventing queue managed by platform 100 as a pending update until the specified future date arrives, at which time the affected field of the merchant record is updated.

Steps 501-504 are similar to steps 401-404. At step 505, the program prompts for an effective date, which may be either a future date or a date of "now," meaning that the update is intended to take effect immediately. Depending on implementation, the effective date may be entered in relative form (e.g., 60 days from today) or absolute form (e.g., Jan. 1, 2003); some implementations may support both modes.

At step 506, the process determines whether there are any previously entered pending updates to the selected field, e.g., by checking entries in the eventing queue. If so, then at step 507, the operator is advised of the pending update and prompted for instructions. In one embodiment, the operator may choose to cancel the previously entered change, cancel the new change, keep both changes, or supersede all changes with a new value. Canceling the previously entered change causes the corresponding entry to be deleted from the eventing queue. Canceling the new change causes process 500 to abort. Keeping both changes causes the process to proceed to step 508 without any effect on the previous entry. Superseding all changes causes the process to delete the pending update from the eventing queue and return to step 504 to receive new data.

At step 508, edit checks are performed to determine whether the new data will create any conflicts when it goes into effect. This step is generally similar to step 405 in FIG. 4. If a conflict is detected, then the operator is prompted at step 509 to address the conflict; this step and the operator's options may be generally similar to step 407 in FIG. 4.

At step 510, the update is stored or performed. If the effective date is "now," an updating process similar to step 406 (including the "right-time" option) is performed to update the merchant record 200.

If the effective date of the update is in the future, then the update is stored as an entry in the eventing queue and processed when the effective date arrives. In one embodiment, the eventing queue is a separate file from the merchant record, and the entries in the queue may include updates for a number of merchant records. Each entry in the eventing queue generally includes at least the effective date, the merchant identifier for the record to be updated, the field to be updated, and the new value. A batch processing job checks the eventing queue daily (or at other regular intervals); when the effective date of a particular update arrives, the appropriate merchant record 200 in merchant master database 110 is updated using the new value. Where VSAM or other back-built data files are used to provide merchant information, the eventing-queue processing job is advantageously implemented to execute just prior to the back-build operation.

Logging of critical updates (steps 511 and 512) is performed in a manner analogous to steps 408 and 409 of FIG. 4, and the log may be reviewed as described above.

Process 500 may advantageously be used in a number of situations. For instance, an acquirer may decide to change an account fee, giving the merchant 30 days' notice. The update instruction may be entered at the time the notice is delivered, with an effective date 30 days later. Thus, an operator need not remember to enter the change on the specified date. In addition, where it is known in advance that a change affecting many merchants will occur on a given date, it is possible to begin entering update instructions well ahead of time.

It will be appreciated that processes 400 and 500 are illustrative, and that modifications and variations are possible. In addition, processes 400 and 500 may be used as a basis to implement further functionality, examples of which will now be described.

In some instances, multiple non-monetary transactions are intended to take effect concurrently for a particular merchant account. For example, closing a merchant account typically requires modifying a number of fields in the merchant master record. In such instances, an "action grouping" may advantageously be defined to reduce the complexity of making the modifications. In an action grouping, one or more non-monetary transactions are performed as a single data entry transaction.

For example, an action grouping may be used to close a merchant account. The user inputs a single instruction to close the account. This instruction causes several non-monetary transactions to be generated, such as disabling automated clearinghouse functions and card acceptance switches so that further processing for the merchant cannot occur. Action groupings are advantageously provided when a number of non-monetary transactions routinely need to be performed concurrently. In such cases, using an action grouping can reduce the risk of error (e.g., an operator forgetting to update one of the fields) and the number of operator actions required to implement a change. In addition, action groupings may be implemented so that edit checks take into account the combined effect of all the grouped changes, thereby eliminating conflict messages that may occur during a sequence of individual updates to fields using process 400.

In other instances, the same non-monetary transaction needs to be entered for a number of merchants. For instance, if the U.S. Postal Service changes a zip code, all merchant records with addresses affected by the change must be updated. As another example, if a corporate owner of a chain of retail stores adopts a new policy of accepting a certain card product, all merchant records associated with the chain must be updated to support acceptance of that card product. To facilitate data entry in such cases, a "power entry" process is provided, in which multiple merchant records may be selected and the non-monetary transaction entered for all selected records in one data entry process. The power entry process may be essentially similar to processes 400 and/or 500, except that multiple merchants may be selected in the first step. Groups of merchants may be selected based on one or more account-level settings, such as industry classification (using, e.g., SIC codes), mode of monetary transaction entry (e.g., paper, tape, electronic), location (e.g., zip code), sales territory, or any other parameter provided by merchant record 200.

Figure 6:
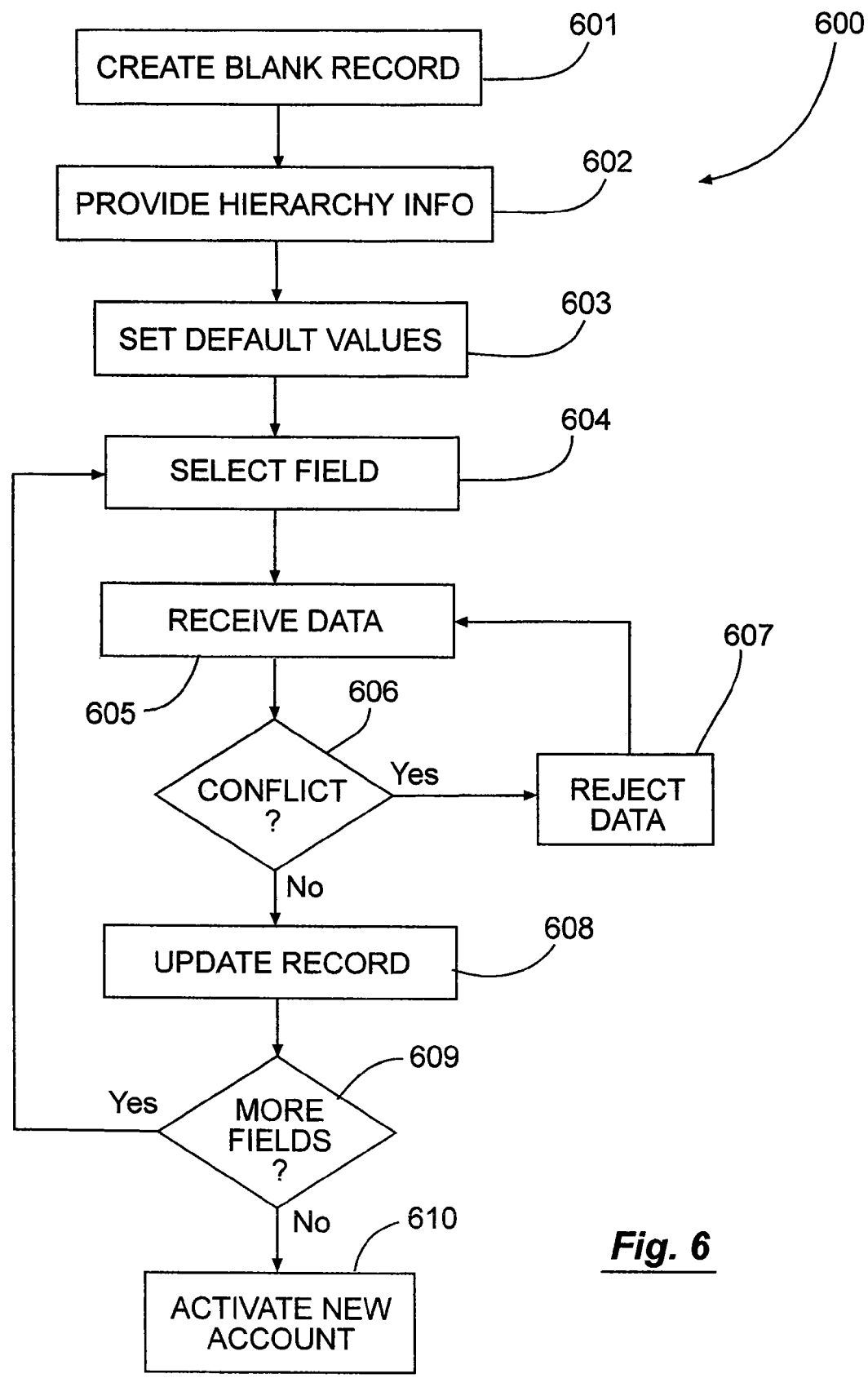
FIG. 6 is a flow chart of an exemplary process for creating a new merchant account according to the present invention.

Creation of a new merchant account may be implemented as a series of non-monetary transactions, as shown in the exemplary process of FIG. 6. At step 601, a new (empty) database record 200 is created for the merchant. At step 602, hierarchy information is entered for the new record; for instance, the merchant is assigned to a client, system, principal, and/or agent. At step 603, default values are automatically entered into all fields for which default values have been previously defined. In one embodiment, any field may have a default value, depending on the preferences of the third-party provider or the acquirer. A default value may be defined globally, i.e., for all new merchant accounts, or for accounts within a part of the hierarchy. For instance, the acquirer may establish a uniform statement fee or monthly account maintenance fee applied to all merchants; these default values may be set at the client level. In the case of chain merchants, defaults for a number of fields (e.g., corporate address information, accepted card products, mode of ticket submission, and type of business) may be established at the chain headquarters level. It will be appreciated that providing default values may reduce the manual data entry required to open a new merchant account.

At step 604, an unpopulated field of the new merchant record 200 is selected. Selection may be performed manually by the operator creating the account, or the "open" process may be configured to select each unpopulated field sequentially. At step 605, the process receives data for the selected field. At step 606, edit checking is performed, and detection of a conflict results in a rejection of the entry at step 607 and a prompt to re-enter the data at step 605. Alternatively, edit checking may be performed only after data entry for all fields is completed. At step 608, the record is updated to reflect the entered data. At step 609, it is determined whether more unpopulated fields remain. This determination may be made either by prompting the operator or automatically. If unpopulated fields remain, the process returns to step 604 to select another unpopulated field.

If no unpopulated fields remain, the new account is activated at step 610. In embodiments where processing is done from VSAM files (or other files) rather than directly from merchant database 110, it will be appreciated that the account is inactive until a VSAM file is built. To provide "right time" opening of new accounts, step 610 may include causing a VSAM file for the new merchant to be built on request, so that platform 100 will be able to begin transaction processing for the new merchant without delay. In an alternative embodiment, the VSAM file is built in parallel with the database updating during steps 601-608.

Logging of activity associated with new account creation is not shown in process 600 but is optionally available. Implementation of an audit log may be generally similar to that described above.

It will be appreciated that steps 606, 607, and 608 may be made identical to previously described steps 405 and 407. Thus, account opening process 600 may be implemented to repeatedly invoke process 400 for performing individual non-monetary transactions, with the merchant selection and field selection steps being performed automatically rather than having the operator manually perform the selections. One skilled in the art will recognize that the foregoing processes are merely examples, and that process steps may be modified or varied.

IV. Monetary Transaction Processing

Merchant processing platform 100 of FIG. 1 also performs processing of monetary transactions for merchants, which may include sales and return transactions, payment transactions (where the cardholder makes a payment on a credit card account at the merchant location), and cash advances, or other types of monetary transactions. In general, during such processing, platform 100 requires various information specific to the merchant; according to embodiments of the present invention, this information is obtained either from merchant records 200 in merchant master database 110 or from a merchant descriptor file (e.g., a VSAM file) built from merchant record 200 as described above. Database 110 and the descriptor files are kept up-to-date using the methods described above. In general, merchant records 200 may be used to provide merchant information as required to complete any monetary transaction.

Figure 7:
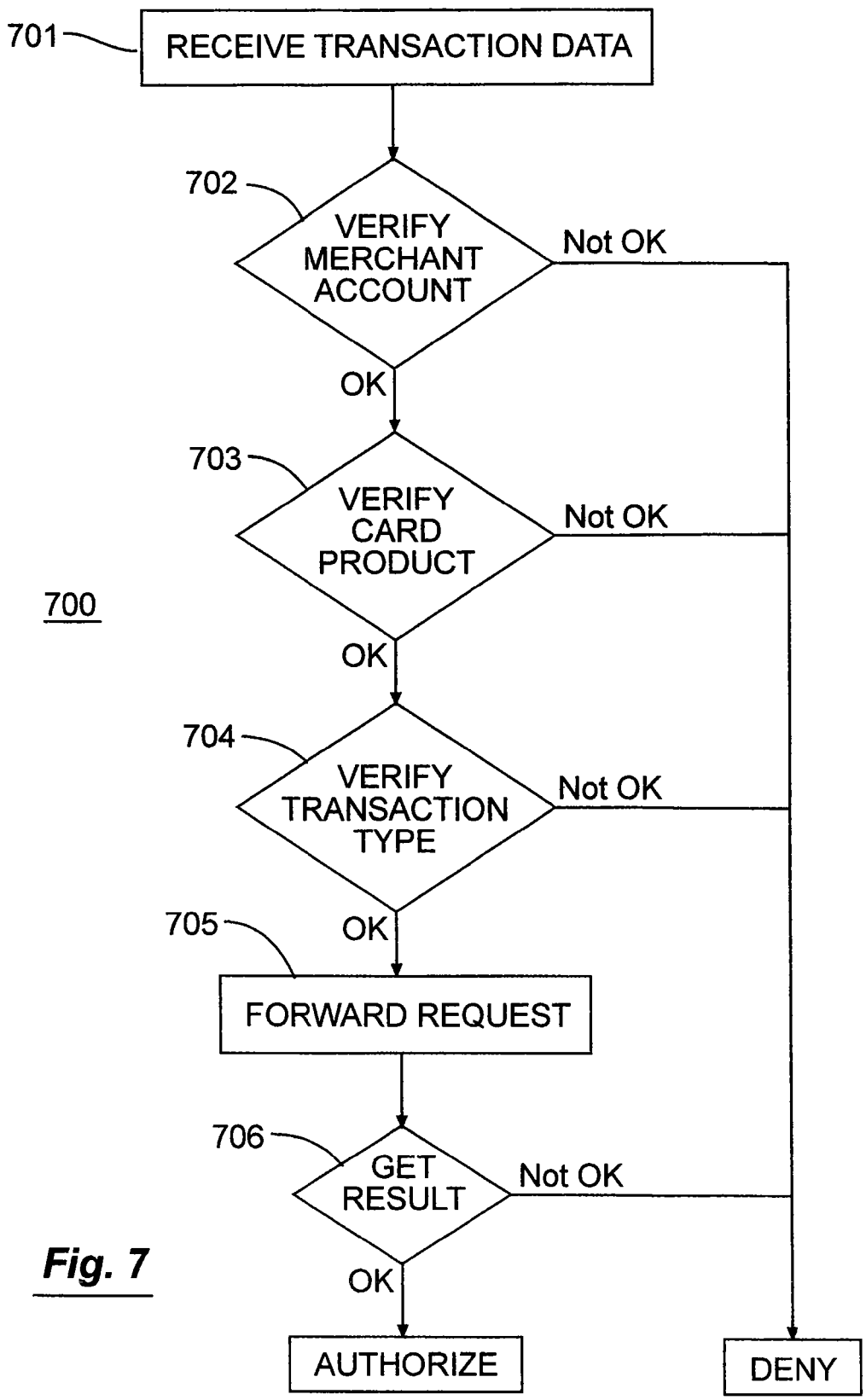
FIG. 7 is a flow chart of an exemplary process for authorizing a merchant monetary transaction according to the present invention.

For instance, FIG. 7 illustrates an exemplary process 700 for handling an authorization transaction. Such transactions are typically submitted by a merchant when a cardholder presents a purchase card. At step 701, transaction data are received from a merchant. The data include a merchant identifier, a card number obtained from the purchase card presented by the cardholder, a transaction type (e.g., sale, cash advance), and a transaction amount. At step 702, merchant master database 110 is accessed using the merchant identifier to determine whether the merchant has a valid account. This may be determined in part by the presence or absence of a merchant record 200 for the merchant. If a merchant record 200 is not found, then the account is invalid and the authorization is denied. If a merchant record 200 is found, the merchant record 200 is checked to determine whether the account is currently valid or not.

If the account is valid, then at step 703, the merchant record 200 is again used to determine whether the merchant is authorized to accept the card product presented. In one embodiment, the card product presented may be determined from the credit card number in a manner known in the art, e.g., by reference to the first few digits of the card number. Process 700 checks merchant record 200 to determine whether this card product is one that the merchant accepts. If platform 100 is unable to identify the card product, or if it is determined that the merchant is not authorized to accept the card product, the authorization is denied. Otherwise, the process proceeds to step 704, where the transaction type provided with the transaction data is verified. Again, data from the merchant master record 200 is used to determine whether the merchant is authorized to accept transactions of the specified type. (For instance, a retailer may be authorized to accept a card association's cards for sales transactions, but not for payment transactions.) If the transaction type is not authorized, the authorization is denied. Otherwise, at step 705 an authorization request is forwarded to an appropriate entity for authorization. The appropriate entity may be determined based on the card product and/or other information, such as the system to which the merchant account is assigned. For instance, in one embodiment, if the card product is an association A card, the appropriate entity is association A. At step 706, a decision is returned from the appropriate entity, which may be either an approval or a denial. In either case, the result is transmitted to the merchant.

It will be appreciated that process 700 is illustrative, and that steps may be modified or varied. In general, any sequence of authorization steps, a number of which are known in the art, may be used, with a merchant record 200 supplying the needed merchant-specific information 200. In an alternative embodiment, authorization may be performed as described in the above-referenced co-pending U.S. patent application Ser. No. 10/245,784.

Figure 8:
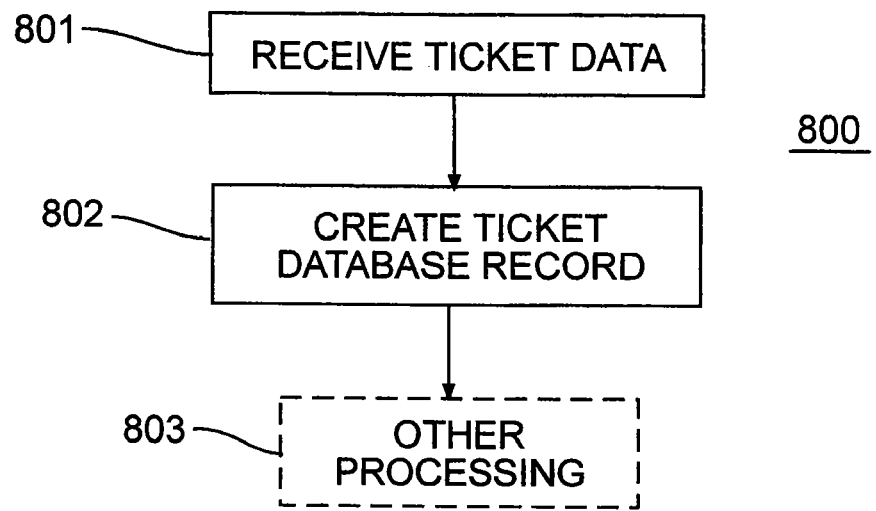
FIG. 8 is a flow chart of an exemplary process for ticket acquisition according to the present invention.

As another example, a ticket acquisition process using merchant master database 110 will now be described. As is known in the art, after completing a transaction with the cardholder, a merchant presents a transaction ticket (or simply "ticket") to the acquiring bank for payment. Tickets may be presented in batch (e.g., all tickets for the day's transactions are presented at the end of the day) or in any other suitable fashion. For some transactions (e.g., transactions using electronic debit networks), authorization and acquisition may occur at the same time. Platform 100 performs automated ticket acquisition; an exemplary process is shown in FIG. 8. At step 801, the system receives the ticket data from the merchant. The ticket data may be received in paper or electronic form; paper tickets may be converted to electronic form by any suitable methods, a number of which are known in the art.

Figure 9:
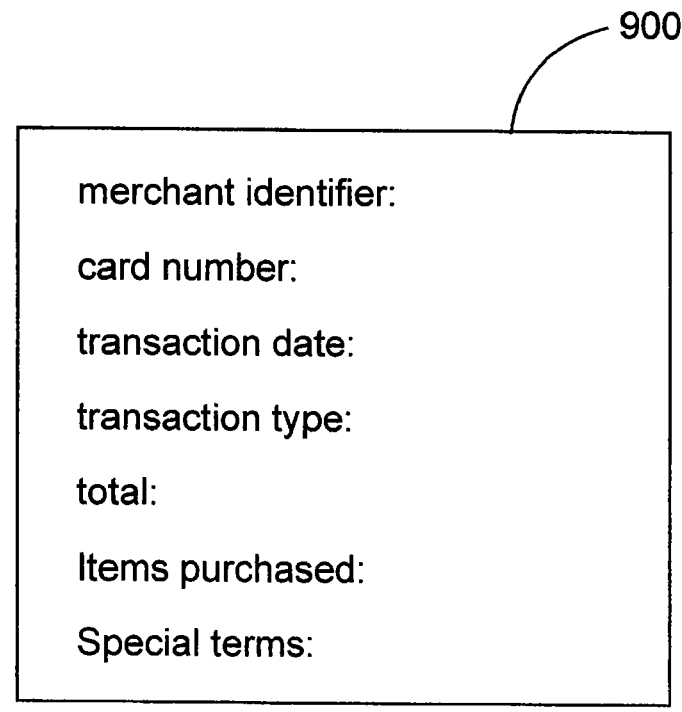
FIG. 9 is a simplified block diagram of a ticket database record according to an embodiment of the present invention.

At step 802, a ticket record (in ticket database 115) is created for the ticket. An example of a ticket record 900 is shown in FIG. 9. The record includes the merchant identifier, transaction date, transaction type, transaction amount, and credit card number. The record may also include additional information, such as specific items purchased (in the case of a sales transaction) or whether the transaction is subject to special terms (e.g., 90 days same as cash). Industry-specific data elements may be included, e.g., ticket itinerary information in the case of airlines, rental data in the case of auto rental agencies, check in/check out information in the case of hotels. The ticket record also includes status information indicating the progress of processing for the ticket. Information in the ticket database 115 is updated as tickets are received and processed. As described below, ticket database information is viewable by acquirers.

In some embodiments, ticket records 900 may be created during authorization, including some or all of the ticket information. These records may be matched to subsequently submitted tickets.

At step 803, the ticket is subject to further processing, details of which depend on the particular implementation. For instance, further processing may include fraud or risk detection processes, sending the ticket information to the appropriate destination (e.g., a card association or another processor), sending the ticket into interchange qualification processing, settlement processing (i.e., exchange of funds), and similar processing steps known in the art. In some implementations, steps 801 and 802 may be performed for an individual ticket as a particular merchant-cardholder transaction is completed, in which case step 803 may include holding the received tickets for a period of time before performing further processing in batch. Status information included in ticket record 900 is also updated as the various steps occur.

Figure 10:
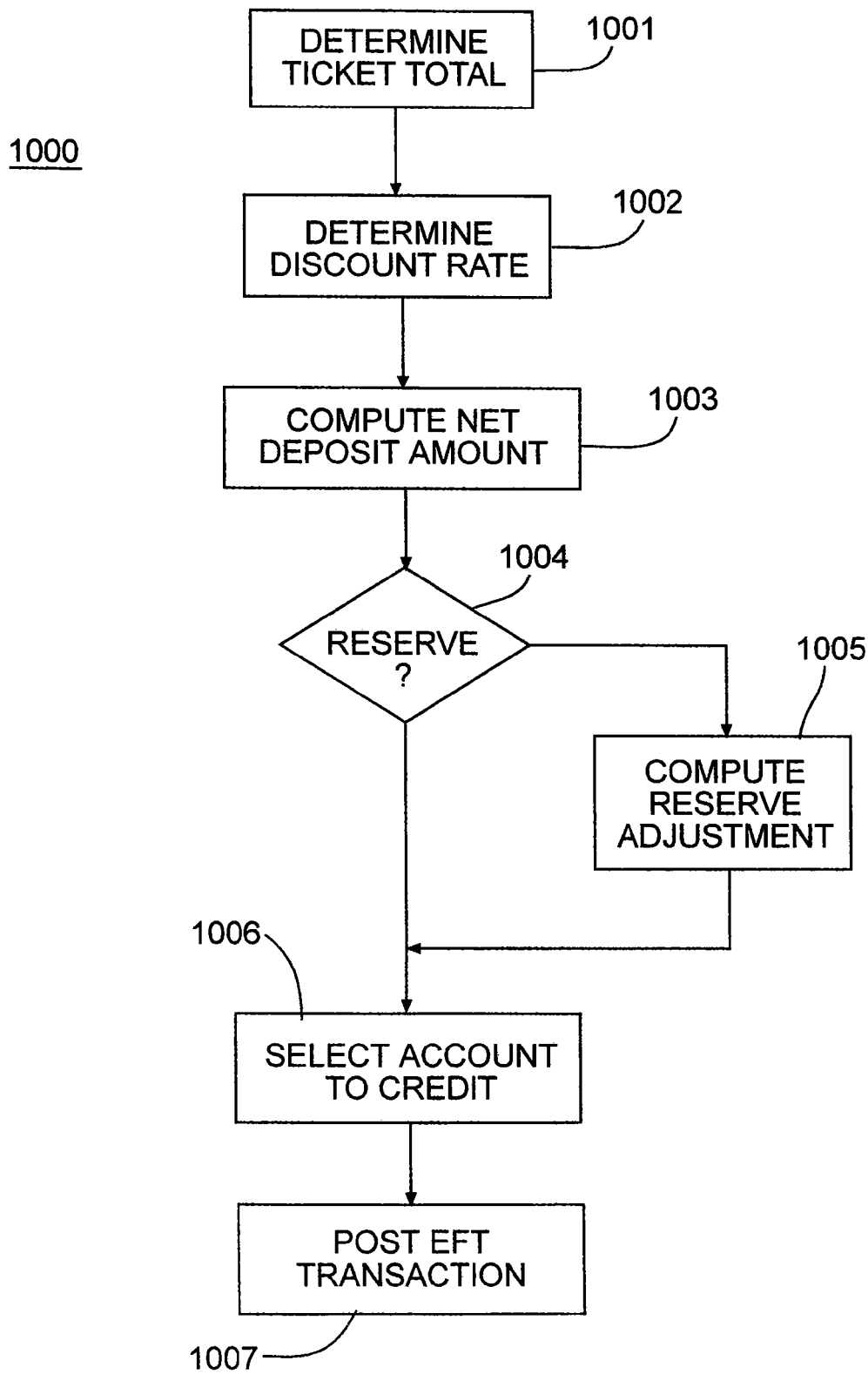
FIG. 10 is a flow chart of an exemplary process for posting a deposit to a merchant account according to the present invention.

FIG. 10 illustrates a process for transferring funds to a merchant account during batch acquisition of sales tickets. In one embodiment, this process follows step 803. At step 1001, a ticket total is determined, either from the ticket database or from another store of ticket information. At step 1002, the applicable discount rate is determined from the merchant master database record. At step 1003, the net deposit amount is determined by using the discount rate to reduce the ticket total. In some embodiments, steps 1001, 1002, and 1003 are performed for an entire batch of tickets, and step 1001 includes summing the transaction amounts for all tickets in the batch. In other embodiments, steps 1001, 1002, and 1003 are performed for each ticket, for instance, if the discount rate can vary from one sales transaction to the next within a batch.

In some embodiments, automatic collection of a reserve against the merchant account is supported. Accordingly, at step 1004, it is determined whether the merchant participates in a reserve. Where the acquirer uses the automated reserve collection feature, the merchant is subjected to having a portion of its daily deposits held by the acquirer for the purposes of mitigating risk. The reserve system may be controlled at any hierarchical level so that all merchants or a subset of merchants can be selected to participate. For instance, an acquirer may choose to require a reserve only for high-risk merchants and group those merchants together using hierarchy 300 as described above.

Using the automated reserve feature, the acquirer may hold a whole dollar amount or a percentage of the merchant's total deposits, for all card products or only certain card products (e.g., the acquirer may hold a 10% reserve against ticket amounts from transactions using interchange card products and no reserve against ticket amounts from transactions using other card products).

Preferably, information regarding the applicable reserve rules is contained in the merchant record 200. If there is a reserve, then at step 1005, the applicable reserve deduction is computed. In some embodiments, the reserve is implemented by including in merchant master record 200 (FIG. 2) a reference to program code that implements the appropriate reserve terms, and step 1005 includes executing the referenced code. For example, the acquirer may be entitled to hold in reserve 10% of all deposits for a particular merchant, up to a maximum reserve of $50,000. In this example, at step 1005, the amount currently held in reserve would be determined. In one embodiment, the totals held in reserve are stored in separate files from the merchant record 200; these files are accessed at step 1005. Then 10% of the net deposit amount computed in step 1003 is determined. Next, it is determined whether adding that amount to the current reserve would cause the reserve to exceed $50,000. If so, then the difference between the current reserve and $50,000 is the reserve deduction. Otherwise, 10% of the net deposit amount is the reserve deduction. The net deposit amount is then adjusted by the reserve deduction. The reserve deduction amount is moved via Automated Clearinghouse (ACH) transfer (or other automated funds transfer) to a demand deposit account specified by the acquirer. Alternatively, the amount may be recorded as a general ledger entry without a funds transfer, or a report may be generated, on the basis of which the acquirer can move the funds manually.

At step 1006, the merchant account to which funds are to be transferred is selected. The merchant account information is preferably stored in the merchant record 200 (FIG. 2). In some embodiments, information for multiple merchant accounts may be included, with each account associated with one or more usage codes, as described above. Where usage codes are present, step 1006 includes selecting the account associated with the usage code corresponding to deposits. At step 1007, a deposit of the net deposit amount, adjusted for reserve deductions where applicable, is posted. In some embodiments, the deposit is posted via ACH transfer. The ticket record in the ticket database may be updated with a status indicator indicating that the merchant has been paid.

To reduce the number of funds transfer transactions, sums to be transferred can be accumulated for a batch of tickets and a single transfer transaction generated at the end of the batch. Accumulation processes known in the art may be used. Similarly, amounts to be transferred to a reserve can also be accumulated for a batch of tickets to further reduce the number of funds transfer transactions required.

Settlement with the card issuer is conducted after acquisition. Preparation of settlement requests may be implemented using known techniques. Ticket data may be obtained from ticket records 900 in ticket database 115 or from another store of ticket data. In one embodiment, ticket record 900 includes all information needed for settlement of the transaction. In addition, it will be appreciated by one of skill in the art that a ticket record 900 may also be used to retrieve information about the original ticket during chargeback processing.

It will be appreciated that the foregoing processes are examples and that process steps may be varied or combined. Similar processes may also be implemented to perform other transactions; for instance, processing a transaction that requires debiting a merchant account may involve selecting the appropriate merchant account to debit according to a usage code in the merchant record 200. To obtain merchant-specified information, processing jobs may either access merchant records 200 in merchant master database 110 directly or use merchant descriptor files, which may be implemented using VSAM file technology, to obtain merchant information. Because merchant records 200 and, if applicable, merchant descriptor files can be updated on a right-time basis, as described above (Section III), information used in monetary transaction processing can be more easily kept current.

V. Reporting and External Access to Data

Platform 100 of FIG. 1 may also be used to generate reports and other correspondence to be provided to merchants or acquiring banks. In addition, various information from merchant master database 110 and ticket database 115 may be made available via external user interface 155. Exemplary embodiments of reporting and data access functionality will now be described.

One aspect of generating a report or other correspondence is identifying the correct recipient. As described above, a merchant master database record 200 (FIG. 2) may include multiple addresses associated with the merchant, and different addresses may be used for different types of correspondence.

Figure 11:
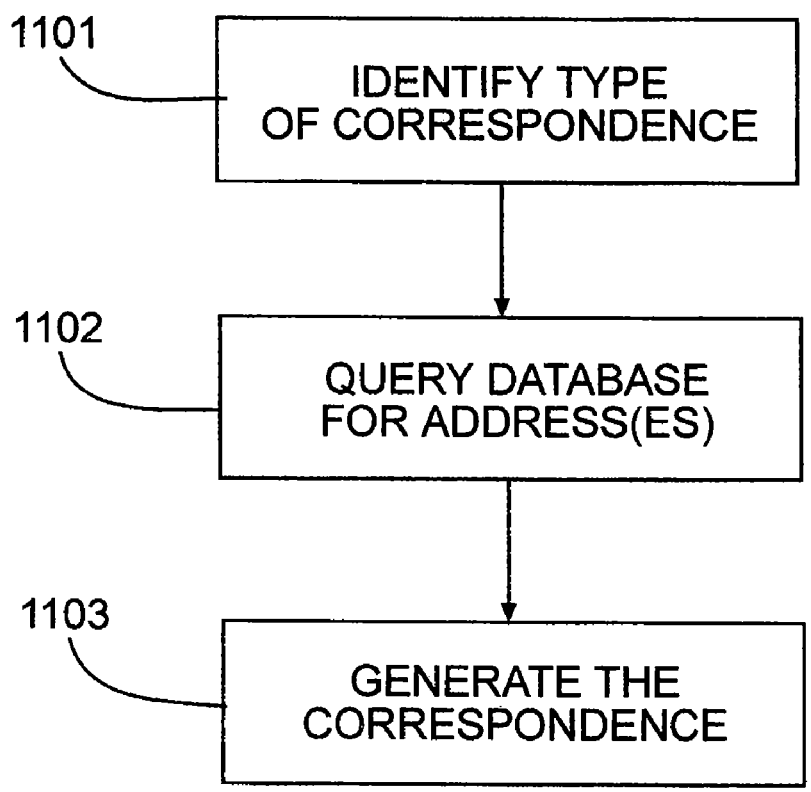
FIG. 11 is a flow chart of an exemplary process for generating merchant correspondence according to the present invention.

A process 1100 for selecting one or more recipients for a particular type of correspondence is illustrated in FIG. 11. At step 1101, the type of correspondence is identified. For instance, if a scheduled process runs to generate a monthly account statement, the process may be configured to select a usage code corresponding to monthly account statements. At step 1102, the process queries merchant record 200 for address(es) associated with the selected usage code and receives in response one or more addresses, for instance addresses of an outside accounting firm and the merchant's finance department. At step 1103, the process generates a copy of the correspondence to be sent to each address received at step 1102. Thus, any type of correspondence may be directed to one or more appropriate recipients. The content of the correspondence may be generated by any appropriate method, such as well-known software for generating form letters or account activity reports. Processes for managing correspondence addresses are described further in the above referenced co-pending U.S. patent application Ser. No. 10/119,205.

The present invention also provides acquirers or merchants with access to ticket records 900 contained in ticket database 115 via external user interface 155 (FIG. 1). The information may advantageously be made viewable without permitting updates or modifications. In one embodiment, a third-party provider manages ticket database 115, and an acquirer client is able to access ticket information using acquirer-defined queries. For example, the acquirer may request to view all of the transactions that were processed for a specific type of merchant (e.g., all auto-rental merchants) to determine profitability. The acquirer may also access specific transactions in order to comply with reporting requirements established by various card associations or issuers.

Additionally, access to merchant data or ticket database data can be provided via the World Wide Web. Secure transmission of data can be provided using known security software, and a graphical user interface may be implemented using conventional software such as First Data Merchant Services' eMerchantView$^{SM}$ product and/or IBM's Webspheres$^{SM}$ product, or other products. In addition, the same interface may be used for internal user interface 125 to perform database updates. Using World Wide Web technology can simplify the task of providing data access to merchants, acquirers, or other parties at remote locations.

While the invention has been described with respect to exemplary embodiments, one skilled in the art will recognize that numerous modifications are possible. For instance, an acquirer may outsource various combinations of its merchant processing activities to a third-party services provider; in such cases, a plurality of platforms will generally be used for merchant processing. Some of the platforms may be controlled by the acquirer while others are controlled by the third-party services provider. Similarly, the merchant master database and/or ticket database may be implemented as multiple databases containing subsets of the data. In addition, the present invention may be implemented using any combination of software and/or hardware. Moreover, while the invention has been described with reference to credit card or purchase card transactions, one of ordinary skill in the art will recognize that the invention may also be used for processing merchant transactions involving other types of non-cash payment instruments, e.g., debit cards or electronic checks;

Thus, although the invention has been described with respect to exemplary embodiments, it will be appreciated that the invention is intended to cover all modifications and equivalents within the scope of the following claims.

What is claimed is:

1. A method for providing purchase card transaction processing services to a plurality of merchants, the method comprising:

associating, using a merchant financial account record system, a merchant account record with a merchant, the merchant account record including a plurality of fields for storing merchant-specific information, at least a portion of the merchant-specific information relating to merchant direct access authorization, and wherein the merchant account record system is managed at least in part by an entity which provides purchase card transaction processing services to the merchant;

processing, using the merchant financial account record system, a non-monetary transaction to update the merchant account record associated with the merchant, including:

identifying the merchant account record to be updated;

receiving input data including information identifying which of the plurality of fields is to be updated and new data to be stored in the identified field;

receiving a request for immediate updating of the identified field;

updating the identified field to store the new data, wherein updating the field is performed substantially without delay upon receiving the request;

providing an external user interface, in operative communication with the merchant account record system and configured to:

receive, from a requested merchant, a request for direct access to a requested record portion of at least one of the merchant account records, wherein the requesting merchant is one of the plurality of merchants, and the requested portion comprises the updated identified field;

verify, using the merchant direct access authorization, whether the requested merchant is authorized to view the requested record portion; and where the requesting merchant is authorized, grant access to the requesting merchant to the requested record portion; and subsequently using the merchant-specific information from the updated merchant account record to process a monetary purchase card transaction submitted by the merchant.

2. The method of claim 1, further comprising:

generating an updated merchant information file from the updated merchant account record, wherein during processing of a monetary purchase card transaction, merchant-specific information is obtained by accessing the updated merchant information file.

3. The method of claim 1, wherein processing a monetary purchase card transaction includes:

receiving transaction data for the monetary purchase card transaction from the merchant, the transaction data including a purchase card identifier and a transaction type identifier;

determining from the merchant-specific information whether the merchant is authorized to accept a purchase card corresponding to the purchase card identifier;

determining from the merchant-specific information whether the merchant is authorized to submit transactions of a type corresponding to the transaction type identifier; and routing the transaction to a routing destination.

4. The method of claim 3, wherein processing a monetary purchase card transaction further includes:

creating a ticket record in a ticket data store using the transaction data for the monetary purchase card transaction; and adding ticket status information to the ticket record, wherein the ticket status information is updated to reflect a current status of processing of the purchase card transaction.

5. The method of claim 3, wherein processing a monetary purchase card transaction further includes:

determining a transaction total from the transaction data;

determining a discount rate from the merchant-specific information; and computing a net deposit amount by reducing the transaction total according to the discount rate.

6. The method of claim 5, wherein processing a monetary purchase card transaction further includes:

transferring funds corresponding to the net deposit amount to a merchant account for the merchant, wherein an identifier of the merchant account is included in the merchant-specific information.

7. The method of claim 6, wherein the merchant-specific information for the merchant includes a plurality of account identifiers, each account identifier associated with at least one of a plurality of usage codes, the method further comprising:

selecting one of the plurality of usage codes; and using the account identifier associated with the selected usage code to identify the merchant account to which funds corresponding to the net deposit amount are to be transferred.

8. The method of claim 5, wherein processing a monetary purchase card transaction further includes:

determining from the merchant-specific information whether the merchant participates in a reserve; and when the merchant participates in a reserve:

computing a reserve adjustment amount;

reducing the net deposit amount by the reserve adjustment amount;

transferring funds corresponding to the reserve adjustment amount to a reserve for the merchant; and transferring funds corresponding to the reduced net deposit amount to a merchant account for the merchant.

9. The method of claim 1, further comprising:

prior to updating the identified field to store the new data, performing an edit check to detect a conflict between the input data and reference data; and notifying a user when a conflict is detected.

10. The method of claim 9, wherein the reference data is data in another field of the merchant record.

11. The method of claim 9, wherein the reference data is data relating to industry rules.

12. The method of claim 1, further comprising adding a new merchant for which purchase card transactions are to be processed, wherein adding a new merchant includes:

creating a new merchant account record for storing merchant-specific information for the new merchant;

populating at least one of a plurality of fields in the new merchant account record with respective default values;

receiving input data including a value for at least one of the plurality of fields;

in response to a user request, activating the new merchant account, thereby enabling the new merchant to submit purchase card transactions, wherein activating the new merchant account is performed either substantially without delay upon receiving the user request or at a subsequent scheduled time, the user request specifying when activating the new merchant account is to be performed; and subsequent to activating the new merchant account, using the merchant-specific information from the new merchant account record to process monetary purchase card transactions for the new merchant.

13. The method of claim 12, wherein activating the new merchant account includes:

generating a new merchant information file from the respective default values and the input data, wherein during processing of monetary purchase card transactions for the new merchant, the merchant-specific information is obtained by accessing the new merchant information file.

14. The method of claim 1, further comprising:

in response to a single user request, processing a non-monetary transaction to update more than one of the plurality of merchant account records, including:

identifying from the single user request a group of merchant account records to be updated;

receiving input data, including information identifying a field in each of the group of merchant account records to be updated and new data to be stored in the identified field; and updating the identified field in each of the group of merchant account records either without substantial delay or at a subsequent scheduled time, wherein the input data specifies when the identified field is to be updated.

15. The method of claim 14, wherein processing a non-monetary transaction to update more than one of the plurality of merchant account records further includes:
- receiving an effective date for the update, the effective date corresponding to either immediate updating or updating at a subsequent scheduled time; and
- wherein updating the identified field in each of the group of merchant account records includes:
  - upon receiving an effective date corresponding to immediate updating, updating the identified field in each of the group of merchant account records without substantial delay; and
  - upon receiving an effective date corresponding to updating at a subsequent scheduled time:
    - queuing the input data in association with the effective date and the identified group of merchant account records in the eventing queue;
    - automatically and periodically checking the eventing queue to determine whether the effective date has arrived; and
    - when the effective date has arrived, updating the identified field in each of the group of merchant account records.

16. The method of claim 1, further comprising:
- in response to a single user request, updating a plurality of fields in one of the merchant account records using predetermined new data.

17. A method for providing purchase card transaction processing services to a plurality of merchants, the method comprising:
- associating, using a merchant financial account record system, a merchant account record with a merchant, the merchant account record including a plurality of fields for storing merchant-specific information, at least a portion of the merchant-specific information relating to merchant direct access authorization, and wherein the merchant account record system is managed at least in part by an entity which provides purchase card transaction processing services to the merchant;
- processing, using the merchant financial account record system, a non-monetary transaction to update the merchant account record associated with the merchant, including:
  - identifying the merchant account record to be updated;
  - receiving input data including information identifying which of the plurality of fields is to be updated and new data to be stored in the identified field;
  - receiving a request for immediate updating of the identified field;
  - updating the identified field to store the new data, wherein updating the field is performed substantially without delay upon receiving the request;
- wherein updating the identified field comprises rebuilding a virtual storage access method associated with the merchant; and
- subsequently using the merchant-specific information from the updated merchant account record to process a monetary purchase card transaction submitted by the merchant.

* * * * *

UNITED STATES PATENT AND TRADEMARK OFFICE
CERTIFICATE OF CORRECTION

| | |
|---|---|
| PATENT NO. | : 7,424,455 B2 |
| APPLICATION NO. | : 10/245789 |
| DATED | : September 9, 2008 |
| INVENTOR(S) | : Linda L. Kellogg et al. |

It is certified that error appears in the above-identified patent and that said Letters Patent is hereby corrected as shown below:

At column 11, line 36, "I 00" should be -- 100 --
At column 21, line 1 claim 1, "requested" should be -- requesting --
At column 21, line 8 claim 1, "requested" should be -- requesting --

Signed and Sealed this

Fourth Day of November, 2008

JON W. DUDAS
*Director of the United States Patent and Trademark Office*